(12) United States Patent
Martin et al.

(10) Patent No.: US 9,374,801 B1
(45) Date of Patent: *Jun. 21, 2016

(54) ESTIMATING INFORMATION ABOUT AN ANTENNA SYSTEM, BASED ON PROPAGATION-TIME MEASUREMENTS THAT ARE PROVIDED BY WIRELESS TERMINALS

(71) Applicant: Polaris Wireless, Inc., Mountain View, CA (US)

(72) Inventors: Robert Lewis Martin, Antioch, CA (US); David Stevenson Spain, Jr., Portola Valley, CA (US)

(73) Assignee: Polaris Wireless, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/859,228

(22) Filed: Sep. 18, 2015

Related U.S. Application Data

(63) Continuation of application No. 14/792,649, filed on Jul. 7, 2015, now Pat. No. 9,164,162.

(51) Int. Cl.
 *H04W 24/00* (2009.01)
 *H04W 64/00* (2009.01)
 (Continued)

(52) U.S. Cl.
 CPC .......... *H04W 64/00* (2013.01); *H04L 43/0864* (2013.01); *H04W 4/023* (2013.01); *H04W 24/10* (2013.01)

(58) Field of Classification Search
 CPC ........ G01S 5/0252; G01S 5/12; G01S 13/56; G01S 1/02; G01S 5/00; G01S 13/767; G01S 13/84; G01S 13/878; G01S 5/02; G01S 5/0263; G01S 5/0289; G01S 11/04; G01S 13/588; G01S 13/589; H04W 64/00; H04W 88/08; H04W 24/00; H04W 28/04; H04W 56/006; H04W 4/022; H04W 4/02; H04W 24/02; H04W 16/18; H04W 4/023; H04W 88/06; H04W 36/32; H04W 4/025; H04W 36/14; H04W 4/22; H04W 52/241; H04W 52/265; H04W 56/0045; H04W 92/12; H04W 72/1289; H04W 88/00; H04W 4/027; H04W 36/30; H04W 56/0065; H04W 72/1226; H04W 84/18

See application file for complete search history.

(56) References Cited

U.S. PATENT DOCUMENTS

| 5,602,903 A | 2/1997 | LeBlanc et al. |
| 9,220,080 B1 | 12/2015 | Martin et al. |

(Continued)

OTHER PUBLICATIONS

"Notice of Allowance" dated Oct. 19, 2015, issued in related U.S. Appl. No. 14/694,151.

(Continued)

*Primary Examiner* — Nimesh Patel
(74) *Attorney, Agent, or Firm* — Kaplan Breyer Schwarz & Ottesen LLP

(57) ABSTRACT

A location engine that accounts for propagation-time components in an antenna system disposed between i) the base station that serves a wireless terminal and ii) the airwaves over which electromagnetic signals propagate between the antenna elements and wireless terminal. By considering and accounting for these propagation components, the location engine is able to estimate information about the antenna system, such as i) whether the antenna system is a distributed antenna system and ii) the configuration of the antenna system. Based on this estimated information, the location engine is also able to estimate adjustments that can be made to location-related measurements, and, with these adjustments, estimate the location of one or more wireless terminals.

20 Claims, 11 Drawing Sheets

(51) Int. Cl.
*H04L 12/26* (2006.01)
*H04W 24/10* (2009.01)
*H04W 4/02* (2009.01)

(56) References Cited

U.S. PATENT DOCUMENTS

| | | |
|---|---|---|
| 2007/0249400 A1 | 10/2007 | Kaneko et al. |
| 2008/0058017 A1 | 3/2008 | Carter et al. |
| 2008/0261612 A1 | 10/2008 | Mia et al. |
| 2009/0238110 A1 | 9/2009 | Suzuki |
| 2010/0159871 A1 | 6/2010 | Tester |
| 2013/0100882 A1 | 4/2013 | Johansson et al. |
| 2013/0137459 A1 | 5/2013 | Kobayashi et al. |
| 2013/0252629 A1 | 9/2013 | Wigren et al. |
| 2015/0341895 A1 | 11/2015 | Zhang et al. |
| 2016/0044453 A1 | 2/2016 | Chou |

OTHER PUBLICATIONS

"Notice of Allowance", dated Sep. 2, 2015; issued in related U.S. Appl. No. 14/792,649.

"Non Final Office Action" dated Feb. 23, 2016, issued in U.S. Appl. No. 14/818,364.

"Non-Final Office Action" dated Feb. 11, 2016, issued in related U.S. Appl. No. 14/941,371.

830

840

ESTIMATING INFORMATION ABOUT AN ANTENNA SYSTEM, BASED ON PROPAGATION-TIME MEASUREMENTS THAT ARE PROVIDED BY WIRELESS TERMINALS

CROSS-REFERENCE TO RELATED APPLICATION(S)

This application is a continuation of U.S. patent application Ser. No. 14/792,649, filed on Jul. 7, 2015, which is incorporated herein by reference.

FIELD OF THE INVENTION

The present invention relates to telecommunications in general, and, more particularly, to a technique for estimating information about an antenna system in a wireless telecommunications system that comprises one or more distributed antennas, based on propagation-time measurements that are provided by wireless terminals.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

There are many techniques in the prior art for estimating the location of a wireless terminal. In accordance with some techniques, the location of a wireless terminal is estimated, at least in part, from measurements that are reported by the wireless terminal. The reported measurements are of signals measured by the wireless terminal that are transmitted by one or more base stations through their antennas and, in some cases, by Global Positioning System (GPS) satellites. Some techniques rely on signal-strength measurements, while some other techniques rely on time-based measurements, while still some other techniques rely on other types of measurements. In order for these estimation techniques to work, at least some of the transmitted signals have to be strong enough to allow for accurate measurement by the wireless terminal and for reliable processing by the particular technique.

A number of these techniques need to know which infrastructure antenna—as distinguished from the wireless terminal's antenna—radiates the signal that is received and decoded by the wireless terminal. An infrastructure antenna can be present in a variety of configurations; for example, it can be collocated with and coupled directly to a base station, or can be part of a distributed antenna system (DAS), or can be part of another type of antenna system (e.g., a repeater, etc.). In wireless telecommunications systems without distributed or repeater antennas, determining which infrastructure antenna radiates which signal is generally straightforward because each signal is uniquely associated with one infrastructure antenna. Therefore, the decoding and identification of a signal is tantamount to the identification of the infrastructure antenna that radiated the signal.

In wireless telecommunications systems that comprise distributed antenna systems, however, the decoding and identification of a signal does not inherently indicate which infrastructure antenna radiated it. Therefore, the need exists for a technique for estimating information about distributed antenna systems that are present within a wireless telecommunication system, whereupon the information can be used for estimating the location of a wireless terminal or for other purposes.

SUMMARY OF THE INVENTION

The present invention enables estimation of information related to a distributed antenna system (DAS), or to another antenna system having multiple elements that radiate the same signal, and estimation of the location of a wireless terminal in the presence of a DAS, without some of the costs and limitations associated with techniques for doing so in the prior art.

Typically, there are multiple propagation-time components in a transmission path between a base station and a wireless terminal in a coverage area being served by a wireless telecommunications system. One such propagation component is in the antenna system (e.g., a distributed antenna system, etc.) that is disposed between i) the base station that serves a wireless terminal and ii) the airwaves over which electromagnetic signals propagate between the antenna elements (nodes) and wireless terminal.

A location engine of the illustrative embodiment accounts for the afore-described propagation component, and other propagation components as well, through the use of measurement data provided by one or more wireless terminals. By considering and accounting for these propagation components, the location engine disclosed herein is able to estimate information about the antenna system, such as i) whether the antenna system is a distributed antenna system and ii) the configuration of the antenna system. Based on this estimated information, the location engine is also able to estimate adjustments that can be made to location-related measurements, and, with these adjustments, estimate the location of one or more wireless terminals.

In accordance with the illustrative embodiment of the present invention, the location engine, implemented on a server computer or other computing device, receives propagation-time measurements of signals between a base station and a wireless terminal in a coverage area being served by the base station, for one or more wireless terminals and/or base stations. For example and without limitation, a propagation-time measurement can be the round-trip time (RTT) measurement made and reported by wireless terminals in certain third-generation (3G) cellular networks. The location engine can use many data points that are provided by each wireless terminal or provided by potentially many wireless terminals, thereby leveraging a crowdsourced effect.

The illustrative location engine builds and maintains one or more data sets over time, wherein each data set is made up of values that are based on the propagation-time measurements. When the data set is sufficiently large, the location engine generates a statistic of the data set. In at least some embodiments of the present invention, the statistic summarizes i) a measure of location of one or more groupings of data points within the data set (e.g., mean, median, predetermined percentile, etc.), wherein each grouping is defined by a local maximum, ii) a measure of statistical dispersion within the grouping (e.g., standard deviation, range, etc.), or iii) a measure of the shape of the distribution of the grouping (e.g., skewness, etc.), for example and without limitation.

The illustrative location engine then uses the statistic to estimate a characteristic of an antenna system that is communicatively coupled to a base station. The characteristic can represent one or more of the following, for example and without limitation:

a. whether the antenna system is a distributed antenna system,
b. the number of antenna nodes in the antenna system,
c. a cable delay between a predetermined antenna node and a predetermined component of the base station (e.g., a radio transceiver, etc.),
d. whether a predetermined antenna node is serving a particular wireless terminal.

In some embodiments of the present invention, the illustrative location engine then estimates the location of one or more wireless terminals based on the estimated characteristic. For example and without limitation, the location engine can use the characteristic in order to:

a. adjust one or more propagation-time measurements based on a cable-delay characteristic,
b. infer evidence of a location based on a cable-delay characteristic,
c. infer evidence of a location based on having estimated whether a particular antenna node is serving a particular wireless terminal,
d. designate at least one of a plurality of possible locations of a wireless terminal as improbable based on whether an antenna node is serving the wireless terminal, The disclosed techniques are advantageous, at least in part because they enable a location estimation system to resolve at least some of the ambiguity about a multiple-element antenna system that is involved in signal transmissions, including determining the radiating antenna element of a signal component that is detected and measured by a wireless terminal, and used by the system. As a result, the location of a wireless terminal can be estimated more accurately.

In various embodiments of the present invention, a distributed antenna system (DAS) is featured as an antenna system that comprises multiple antenna elements that transmit the same signal. In other embodiments of the present invention, a different type or types of antenna system can be used, as those who are skilled in the art will appreciate after reading this specification. Furthermore, although a location engine is featured in this specification, a different element that embodies the features disclosed herein can be used, as those who are skilled in the art will appreciate after reading this specification.

A first illustrative method comprises: receiving, by a server computer, a plurality of propagation-time measurements of first signals transmitted between i) one or more wireless terminals and ii) a base station, wherein the first signals propagate through at least a portion of an antenna system that is communicatively coupled to the base station; generating a statistic, by the server computer, by applying a predetermined statistical algorithm to a data set, wherein the data set comprises data points that are based on the plurality of propagation-time measurements; estimating, by the server computer, a first characteristic of the antenna system based on the statistic; and transmitting the first characteristic, by the server computer, to an application engine.

A second illustrative method comprises: receiving, by a server computer, i) a first plurality of propagation-time measurements of first signals transmitted between a first wireless terminal and a base station and ii) a second plurality of propagation-time measurements of second signals transmitted between a second wireless terminal and the base station, wherein the first and second signals propagate through at least a portion of an antenna system that is communicatively coupled to the base station; generating a statistic, by the server computer, by applying a predetermined statistical algorithm to a data set, wherein the data set comprises data points that are based on the first plurality of propagation-time measurements and the second plurality of propagation-time measurements; estimating, by the server computer, a first characteristic of the antenna system based on the statistic; estimating, by the server computer, the location of a third wireless terminal based on the first characteristic of the antenna system, wherein the estimating of the location results in a location estimate; and transmitting, by the server computer, the location estimate to a location-based application.

A third illustrative method comprises: receiving, by a server computer, a plurality of propagation-time measurements of first signals transmitted between i) one or more wireless terminals and ii) a base station, wherein the first signals propagate through at least a portion of a distributed antenna system (DAS) that is communicatively coupled to the base station, the distributed antenna system comprising at least two antenna nodes; generating a statistic, by the server computer, by applying a predetermined statistical algorithm to a data set, wherein the data set comprises data points that are based on the plurality of propagation-time measurements; estimating, by the server computer, a first characteristic of a first antenna node of the at least two antenna nodes, based on the statistic; estimating, by the server computer, the location of a first wireless terminal based on the first characteristic of the antenna system, wherein the estimating of the location results in a location estimate; and transmitting, by the server computer, the location estimate to a location-based application.

DETAILED DESCRIPTION

Figure 1:
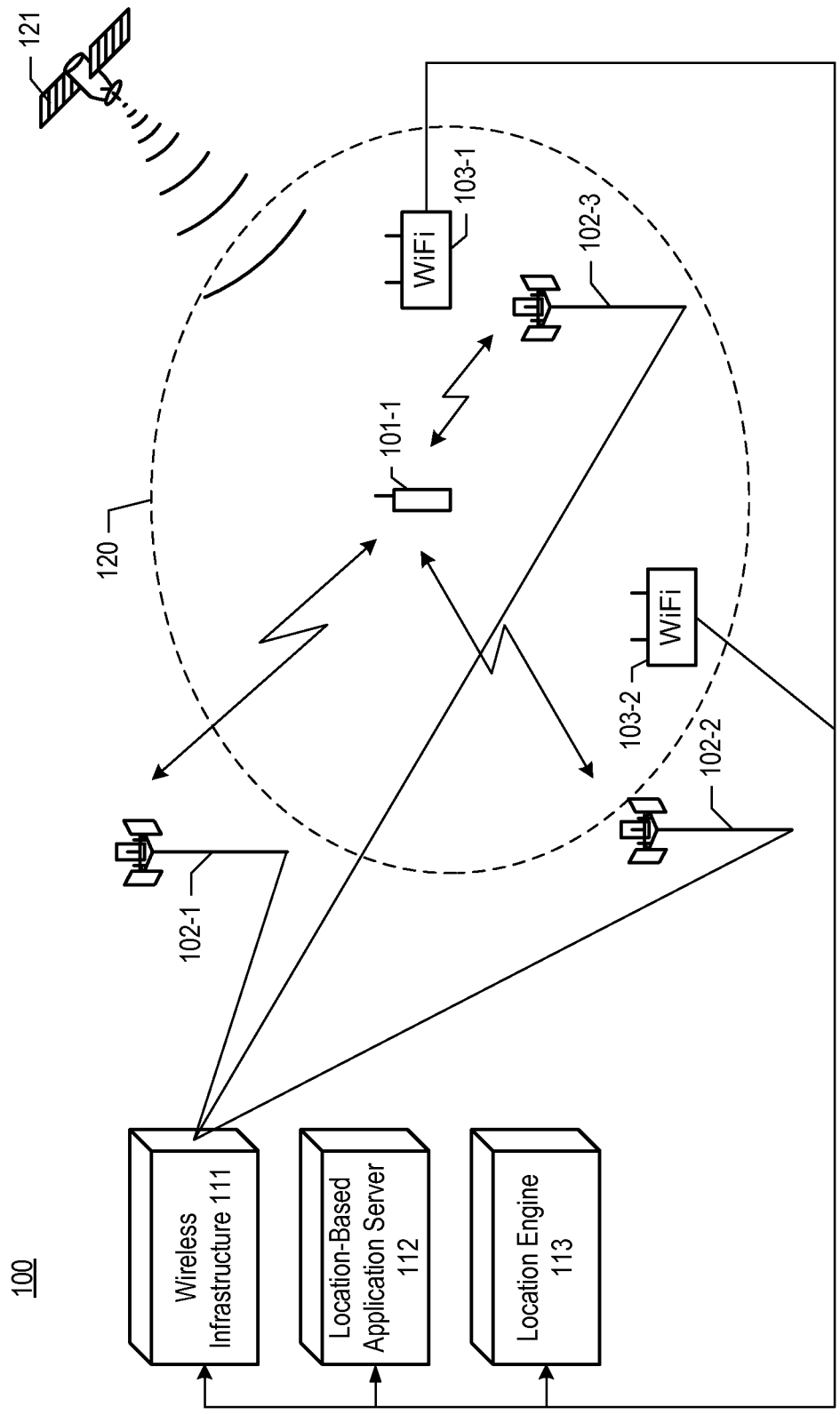
FIG. 1 depicts a diagram of the salient components of wireless telecommunications system 100 in accordance with the illustrative embodiment of the present invention.

Antenna node—For the purposes of this specification, the term "antenna node" and its inflected forms is defined as an antenna element of multiple antenna elements within an antenna system (e.g., a distributed antenna system, etc.), in which at least some of the antenna elements are connected to a common signal source.

Base station—For the purposes of this specification, the phrase "base station" is defined as a wireless communications station installed at a predetermined (e.g., fixed, etc.) location and used to communicate with one or more wireless terminals via radio.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Communicatively coupled—For the purposes of this specification, the term "communicatively coupled" and its inflected forms is defined as being connected so as to enable communication with one or more other devices.

Distributed antenna system—For the purposes of this specification, the term "distributed antenna system" and its inflected forms is defined as a network of spatially separated antenna nodes connected to a common signal source via a transport medium that provides wireless service within a geographic area or structure.

Estimate—For the purposes of this specification, the infinitive "to estimate" and its inflected forms (e.g., "estimating", "estimated", etc.) should be given the ordinary and customary meaning that the terms would have to a person of ordinary skill in the art at the time of the invention.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Location—For the purposes of this specification, the term "location" is defined as a zero-dimensional point, a finite one-dimensional path segment, a finite two-dimensional surface area, or a finite three-dimensional volume.

Processor—For the purposes of this specification, a "processor" is defined as hardware or hardware and software that perform mathematical and/or logical operations.

Propagation time—For the purposes of this specification, "propagation time" is defined as the length of time it takes for a signal to move along a transmission path. A measurement related to propagation time can be time-based; timing-based; delay-based; based on a difference in time, timing, or delay; or based on some combination thereof.

Spatial displacement—For the purposes of this specification, the term "spatial displacement" is defined as the distance along a straight line between two points in space.

Statistic—For the purposes of this specification, the term "statistic" is defined as a single measure of some attribute of a sample, calculated by applying a statistical algorithm to the values of the items of the sample, which are known together as a data set. A "descriptive statistic" can be used to describe the data in a data set.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless network coverage area—For the purposes of this specification, the term "wireless network coverage area" is defined as the geographic area within which a carrier or a set of equipment, or both, provides wireless service.

Wireless terminal—For the purposes of this specification, the term "wireless terminal" is defined as a device that is capable of telecommunications without a wire or tangible medium. A wireless terminal can be mobile or immobile. A wireless terminal can transmit or receive, or transmit and receive. As is well known to those skilled in the art, a wireless terminal is also commonly called a cellular telephone or cellphone, a wireless transmit/receive unit (WTRU), a user equipment (UE), a mobile station, a fixed or mobile subscriber unit, a pager, a personal digital assistant (PDA), a smartphone, a smart watch, a computer, or any other type of device capable of operating in a wireless environment, for example and without limitation.

FIG. 1 depicts a diagram of the salient components of wireless telecommunications system 100 in accordance with the illustrative embodiment of the present invention. Wireless telecommunications system 100 comprises: wireless terminal 101-1, cellular base stations 102-1, 102-2, and 102-3, Wi-Fi base stations 103-1 and 103-2, wireless infrastructure 111, location-based application server 112, location engine 113, and GPS constellation 121, interrelated as shown.

Wireless infrastructure 111, location-based application server 112, location engine 113, and Wi-Fi base stations 103-1 and 103-2 are all connected to one or more interconnected computer networks (e.g., the Internet, a local-area network, a wide-area network, etc.) and, as such, can exchange data in well-known fashion.

Although the illustrative embodiment depicts wireless telecommunications system 100 as comprising only one wireless terminal, it will be clear to those skilled in the art, after reading this disclosure, how to make and use alternative embodiments of the present invention that comprise any number of wireless terminals 101-1 through 101-M, wherein M is a positive integer.

Wireless terminal 101-1 comprises the hardware and software necessary to perform the processes described below and in the accompanying figures. Furthermore, wireless terminal 101-1 is mobile and can be at any location within geographic region 120 at any time.

Wireless terminal 101-1 is capable of providing bi-directional voice, data, and video telecommunications service to a user (not shown), but it will be clear to those skilled in the art, after reading this disclosure, how to make and use embodiments of the present invention in which wireless terminal 101-1 provides a different set of services.

In accordance with the illustrative embodiment, wireless terminal 101-1 is capable of transmitting one or more radio signals—that can be received by one or more of base stations 102-1, 102-2, and 102-3 and Wi-Fi base stations 103-1 and 103-2—in accordance with specific parameters (e.g., signal strength, frequency, coding, modulation, timing offset, etc.), in well-known fashion, and of transmitting at least some of those parameters to location engine 113 as well as other information described below. Additionally, wireless terminal 101-1 is capable of receiving one or more radio signals from each of base stations 102-1, 102-2, and 102-3, Wi-Fi base stations 103-1 and 103-2, and GPS constellation 121, in well-known fashion.

Wireless terminal 101-1 is also capable of identifying each radio signal it receives, in well-known fashion, and of transmitting the identity of each signal it receives to location engine 113. Wireless terminal 101-1 is further capable of measuring one or more location-dependent traits of each radio signal it receives, in well-known fashion, and of transmitting each measurement it generates to location engine 113.

Cellular base stations 102-1, 102-2, and 102-3 communicate with wireless infrastructure 111 via wireline and with wireless terminal 101-1 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 102-1, 102-2, and 102-3 are terrestrial, immobile, and base station 102-3 is within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1, 102-2, and 102-3 comprise the hardware and software necessary to be 3GPP-compliant and to perform the processes described below and in the accompanying figures. For example and without limitation, each of cellular base stations 102-1, 102-2, and 102-3 are capable of continually:

a. receiving one or more radio signals transmitted by wireless terminal 101-1, and
b. identifying each radio signal transmitted by wireless terminal 101-1, in well-known fashion, and of transmitting the identity of those signals to location engine 113, and
c. measuring one or more location-dependent traits of each radio signal transmitted by wireless terminal 101-1, in well-known fashion, and of transmitting the measurements to location engine 113, and
d. transmitting one or more signals to wireless terminal 101-1 in accordance with specific parameters (e.g., signal strength, frequency, coding, modulation, etc.), in well-known fashion, and of transmitting those parameters to location engine 113.

It will be clear to those skilled in the art how to make and use cellular base stations 102-1, 102-2, and 102-3.

Wi-Fi base stations 103-1 and 103-2 communicate with wireless terminal 101-1 via radio in well-known fashion. Wi-Fi base stations 103-1 and 103-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 103-1 and 103-2 are capable of continually:

a. receiving one or more radio signals transmitted by wireless terminal 101-1, and
b. identifying each radio signal transmitted by wireless terminal 101-1, in well-known fashion, and of transmitting the identity of those signals to location engine 113, and
c. measuring one or more location-dependent traits of each radio signal transmitted by wireless terminal 101-1, in well-known fashion, and of transmitting the measurements to location engine 113, and
d. transmitting one or more signals to wireless terminal 101-1 in accordance with specific parameters (e.g., signal strength, frequency, coding, modulation, etc.), in well-known fashion, and of transmitting those parameters to location engine 113.

It will be clear to those skilled in the art how to make and use Wi-Fi base stations 103-1 and 103-2.

Wireless infrastructure 111 comprises a switch that orchestrates the provisioning of telecommunications service to wireless terminal 101-1 and the flow of information to and from location engine 113, as described below and in the accompanying figures. As is well known to those skilled in the art, wireless switches are also commonly referred to by other names such as mobile switching centers, mobile telephone switching offices, routers, and so on, for example and without limitation.

Location-based application server 112 comprises hardware and software that uses the estimate of the location of wireless terminal 101-1—generated by location engine 113—in one or more location-based applications, in well-known fashion. Location-based applications are well-known in the art and provide services such as, and without limitation, E-911 routing, navigation, location-based advertising, and weather alerts.

Location engine 113 is a data processing system that comprises hardware and software that generates one or more estimates of the location of wireless terminal 101-1 as described below and in the accompanying figures. It will be clear to those skilled in the art, after reading this disclosure, how to make and use location engine 113. Furthermore, although location engine 113 is depicted in FIG. 1 as physically distinct from wireless infrastructure 111, it will be clear to those skilled in the art, after reading this disclosure, how to make and use alternative embodiments of the present invention in which location engine 113 is wholly or partially integrated into wireless infrastructure 111.

Figure 2:
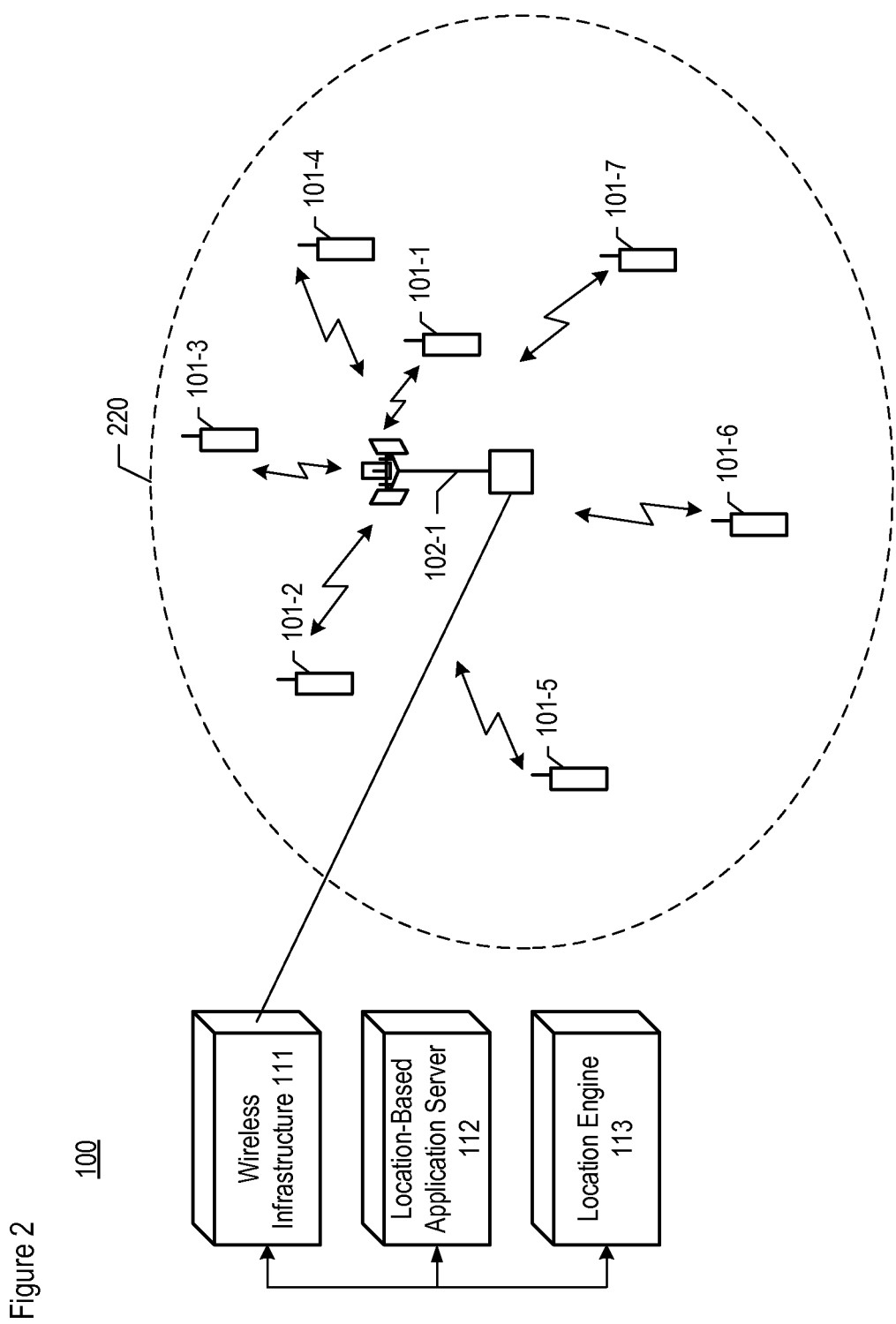
FIG. 2 depicts a diagram of the salient components of wireless telecommunications system 100 that provide telecommunications service to at least some of geographic region 220 or that operate within geographic area 220.

FIG. 2 depicts a diagram of the salient components of wireless telecommunications system 100 that provide telecommunications service to at least some of geographic region 220 or that operate within geographic area 220. In particular, wireless terminals 101-1 through 101-M (wherein M as depicted is equal to 7) operate within region 220, and at least cellular base station 102-1, wireless infrastructure 111, location-based application server 112, and location engine 113 provide service to the wireless terminals and are interrelated as shown. Geographic region 220 can be non-overlapping with region 120 or the regions can at least partially overlap.

Some are all of wireless terminals 101-1 through 101-M are in communication with base station 102-1 at any given moment in time. Additionally, some or all of wireless terminals 101-1 through 101-M can also be in communication with one or more base stations in addition to base station 102-1.

As discussed above, wireless terminal 101-$m$, wherein m can have a value of 1 through M, is further capable of measuring one or more location-dependent traits of each radio signal it receives, in well-known fashion, and of transmitting each measurement it generates to location engine 113. At least some of the location-dependent traits are related to propagation time, and, in particular, propagation delay in some cases. Some propagation-time-related measurements that can be provided by terminal 101-$m$ are as follows, for example and without limitation:

a. the round-trip time (RTT) or round-trip delay time (RTD) of all of the signals transmitted and receivable by wireless terminal 101-*m* through one or more of the base stations.
b. the time advance (TA) of all of the signals transmitted and receivable by wireless terminal 101-*m* through one or more of the base stations.
c. the received temporal difference of each pair of multi-path components (e.g., one temporal difference for one pair of multipath components, a pair of temporal differences for a triplet of multipath components, etc.) of all of the signals receivable by wireless terminal 101-*m* from one or more transmitters.
d. the received delay spread (e.g., RMS delay spread, excess delay spread, mean excess delay spread, etc.) of all of the signals receivable by wireless terminal 101-*m*.
e. the received relative arrival times of two or more multi-path components of all of the signals receivable by wireless terminal 101-*m*, from one or more transmitters (which can be determined by a rake receiver in well-known fashion).

Cellular base station 102-1, as well as other base stations within system 100, is further capable of measuring one or more location-dependent traits of each radio signal it receives from one or more wireless terminals, in well-known fashion, and of transmitting each measurement it generates to location engine 113. At least some of the location-dependent traits are related to propagation time, and, in particular, propagation delay in some cases. Some propagation-time-related measurements provided by base station 102-1 are the same as those listed above, for example and without limitation, except that the signal propagation directions are reversed.

By accumulating the aforementioned measurements that are received from one or more of the wireless terminals or base stations, or both, location engine 113 is capable of performing the tasks described below.

Figure 3:
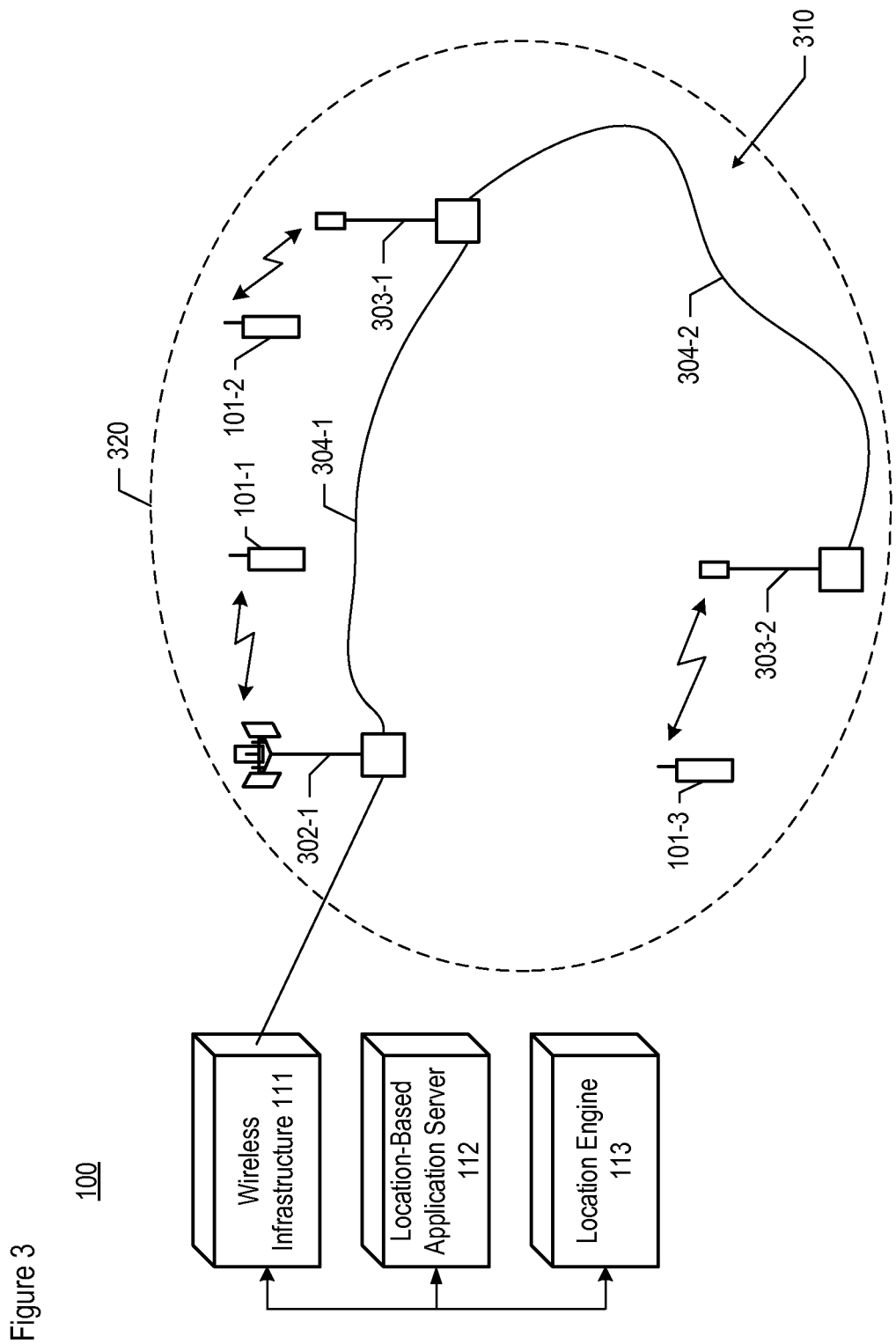
FIG. 3 depicts a diagram of the salient components of wireless telecommunications system 100 that provide telecommunications service to at least some of geographic region 320 or that operate within geographic area 320.

FIG. 3 depicts a diagram of the salient components of wireless telecommunications system 100 that provide telecommunications service to at least some of geographic region 320 or that operate within geographic area 320. In particular, cellular base station 302-1 and antenna nodes 303-1 and 303-2 provide service to wireless terminals 101-1 and 101-2, and are interrelated as shown. Geographic region 320 can be non-overlapping with regions 120 and/or 220, or two or more of the regions can at least partially overlap.

Cellular base station 302-1 is similar to cellular base station 102-1 as described above and in FIG. 1. In addition, base station 302-1 supports a distributed antenna system as is known in the art, depicted as antenna system 310 comprising antenna nodes 303-1 and 303-2 and cable segments 304-1 and 304-2, interconnected as shown. Although a distributed antenna system is featured in accordance with the illustrative embodiment of the present invention, in some embodiments of the present invention a different type of antenna system can be used, as those who are skilled in the art will appreciate after reading this specification. Furthermore, as those who are skilled in the art will appreciate after reading this specification, a different type of distributed antenna system can be used in which the host base station equipment does not have its own collocated antenna as does station 302-1.

Although the illustrative embodiment comprises a single base station that supports a distributed antenna system, it will be clear to those skilled in the art, after reading this disclosure, how to make and use embodiments of the present invention that comprise a different number of base stations that support distributed antennas. Furthermore, although the illustrative embodiment comprises two antenna nodes 303-1 and 303-2, it will be clear to those skilled in the art, after reading this disclosure, how to make and use embodiments of the present invention that comprise a different number of antenna nodes within an antenna system.

As depicted in FIG. 3, base station 302-1 provides a common signal source for both antenna nodes 303-1 and 303-2. For example and without limitation, the common signal source can be a radio at the base station. Cable segments 304-1 and 304-2 are part of a transport medium that provides a transmit signal from the common source to antenna nodes 303-1 and 303-2. Cable segments 304-1 and 304-2 also provide to base station 302-1 the signals received from terminals 101-2 and 101-3 by antenna nodes 303-1 and 303-2, respectively. Each cable segment exhibits a cable delay such as an electrical delay along a coax or other type of transport medium.

FIG. 3 depicts antenna nodes 303-1 and 303-2 in the coverage pattern as shown and with different lengths in the cable segments. As those who are skilled in the art will appreciate, however, after reading this specification the antenna nodes can be arranged in a different coverage pattern. For example and without limitation, a plurality of antenna nodes can be arranged in a relatively linear pattern (e.g., rectilinear, curvilinear, etc.) such as in a tunnel and/or with a uniform cable length between contiguous antenna nodes.

Figure 4:
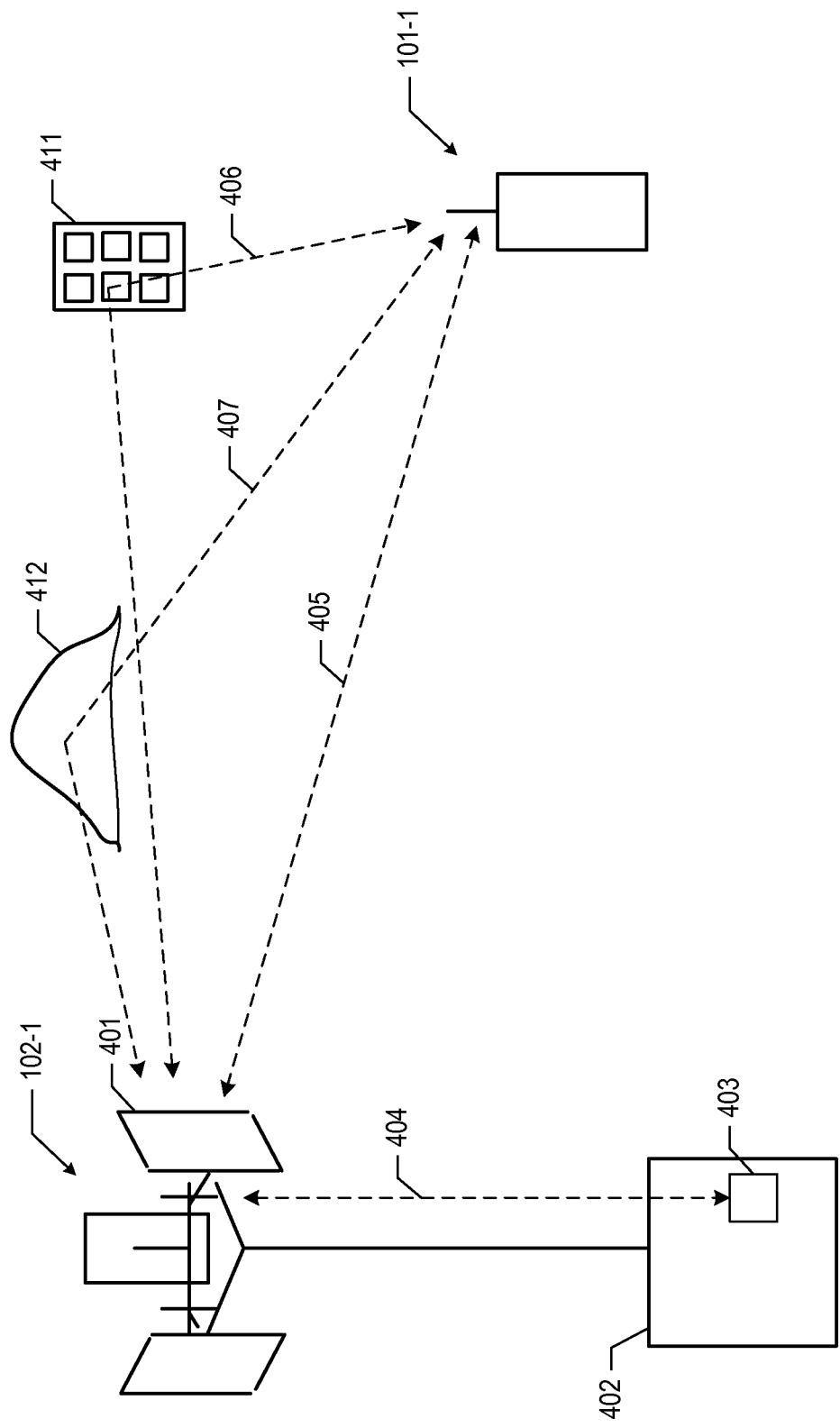
FIG. 4 depicts a diagram of the salient components of cellular base station 102-1, in communication with wireless terminal 101-1 via a transmission path or paths comprising one or more propagation components.

FIG. 4 depicts a diagram of the salient components of cellular base station 102-1, in communication with wireless terminal 101-1 via a transmission path or paths comprising one or more propagation components. Cellular base station 102-1 comprises: one or more antenna elements 301 and base station processing equipment 402, which comprises one or more radios 403. Signal path 404 between antenna element 401 and radio 403, or between element 401 and a different base station equipment component, is characterized by a first propagation delay component that is attributed to the type and length of transmission medium used (e.g., cable, etc.).

As those who are skilled in the art will appreciate after reading this specification, signal path 404 might instead or in addition span the transport medium (e.g., cable segment 304-1, etc.) between an antenna node (e.g., node 303-1, etc.) and a base station component, such as a radio.

Additionally, there are one or more signal paths taken by a signal transmitted between antenna element 401 and wireless terminal 101-1. Signal path 405, which is a direct path, is characterized by a second propagation delay component; signal path 406, which is an indirect path due to reflection off of building 411, is characterized by a second propagation delay component; and signal path 407, which is an indirect path due to reflection off of mountain 412, is characterized by a third propagation delay component. As those who can appreciate after reading this specification, other signal paths can occur based on reflection from other terrestrial objects and from bodies of water, and on phenomena other than reflection. When radio signals reach a receiving antenna by two or more signal paths, multipath is said to occur.

Wireless terminal 101-1 and/or base station 102-1 are capable of making and providing (e.g., to location engine 113, etc.) propagation-time measurements, in which the measurements reflect at least some of the propagation delay components described above.

Figure 5:
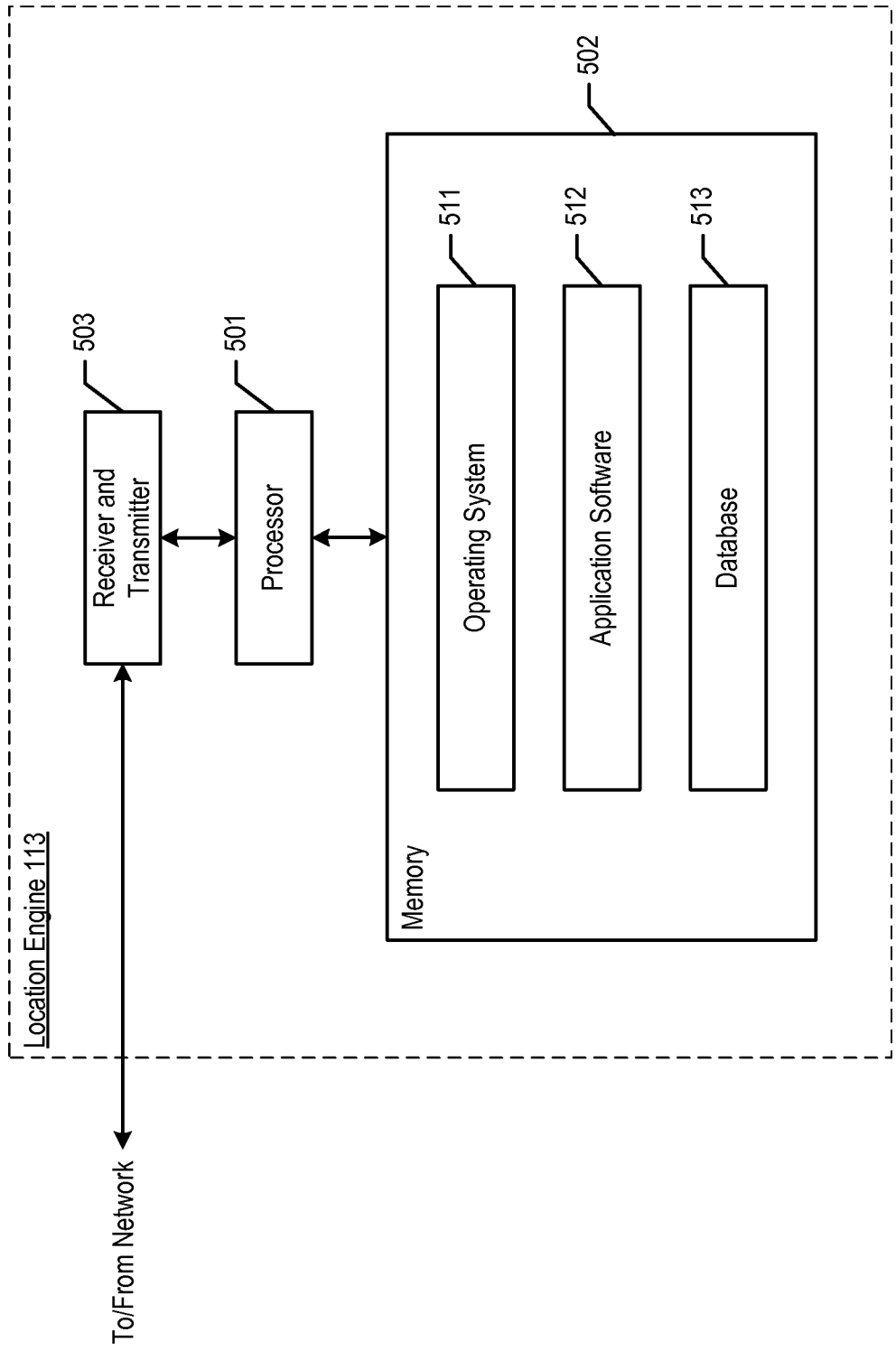
FIG. 5 depicts a block diagram of the salient components of location engine 113 in accordance with the illustrative embodiment of the present invention.

FIG. 5 depicts a block diagram of the salient components of location engine 113 in accordance with the illustrative embodiment. Location engine 113 comprises: processor 501, memory 502, and receiver and transmitter 503, which are interconnected as shown. In accordance with the illustrative embodiment of the present invention, location engine 113 is a server computer. As those who are skilled in the art will appreciate after reading this specification, however, location engine 113 can be a different type of data-processing system or computing device.

Figure 6:
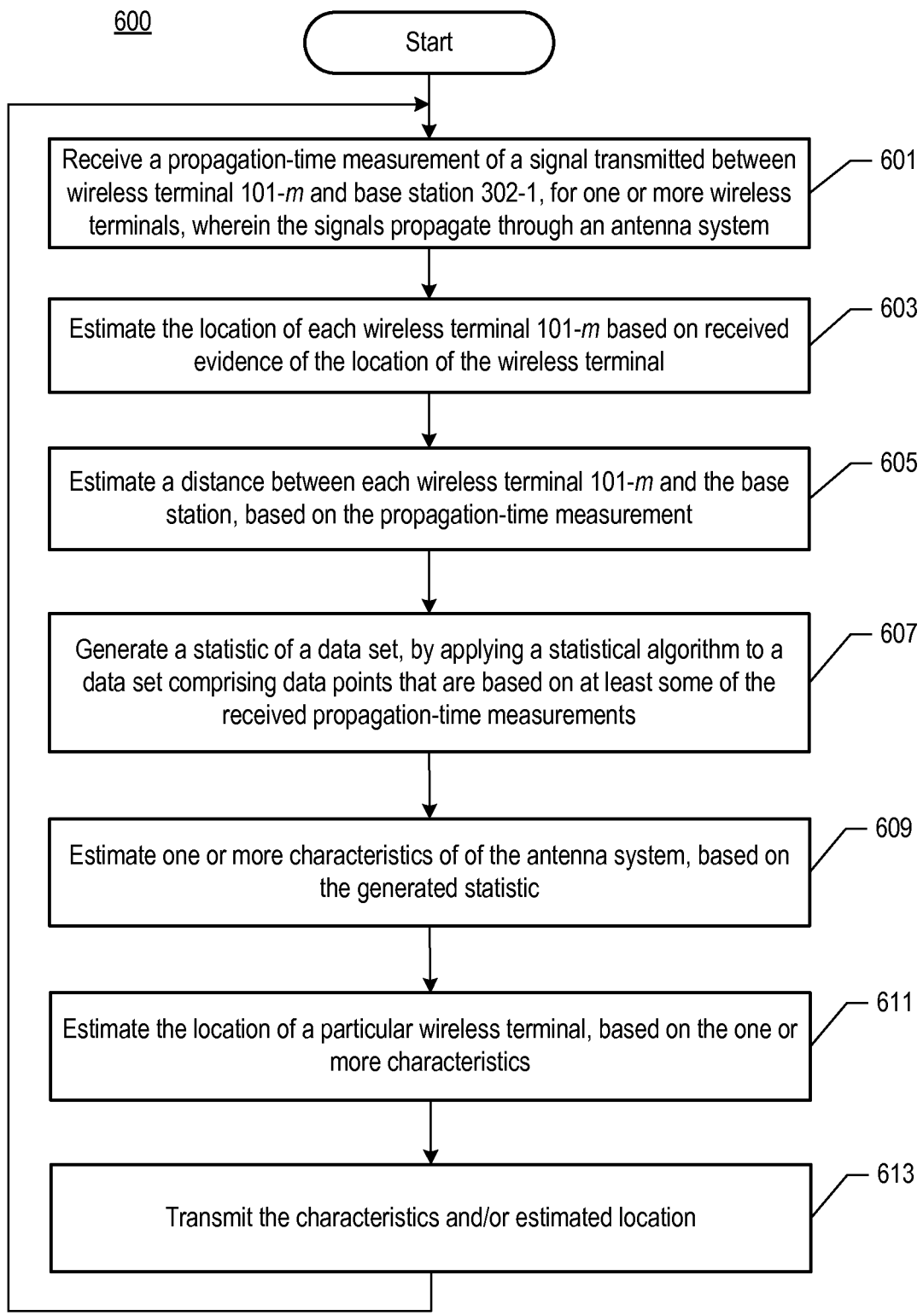
FIG. 6 depicts a flowchart of the salient processes performed in accordance with the illustrative embodiment of the present invention.

Processor 501 is a general-purpose processor that is configured to execute an operating system and the application software that performs the operations described herein, including the operations described in FIG. 6 and other figures. Processor 501 is also capable of populating, amending, using, and managing propagation-time measurements, data sets based on the measurements, statistics of each data set, and so on. It will be clear to those skilled in the art how to make and use processor 501.

Memory 502 is a non-volatile memory that is configured to store:
 a. operating system 511, and
 b. application software 512, and
 c. database 513 for storing one or more data sets as described below.

It will be clear to those skilled in the art how to make and use memory 502.

Receiver and transmitter 503 is configured to enable location engine 113 to receive from and transmit to wireless terminal 101-m, wireless infrastructure 111, location-based application server 112, and the base stations (i.e., cellular and WiFi), in well-known fashion. It will be clear to those skilled in the art how to make and use receiver and transmitter 503.

Operation of the Illustrative Embodiment—

FIG. 6 depicts a flowchart of the salient processes performed in accordance with the illustrative embodiment of the present invention.

The processes performed by wireless telecommunications system 100 of the illustrative embodiment are depicted in the drawings (i.e., FIG. 6 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices, either within location engine 113 or other than location engine 113. In some embodiments of the present invention, some of the depicted processes might be omitted.

For purposes of clarity, wireless terminal 101-1 and cellular base station 302-1 are used as examples of a wireless terminal and base station. Station 302-1 acts as a host of distributed antenna system (DAS) 310 through at least a portion of which signals transmitted between one or more wireless terminals and the base station propagate. However, as those who are skilled in the art will appreciate after reading this specification, at least some of the tasks described below are applicable to other wireless terminals and other base stations (e.g., WiFi, etc.) as well.

At task 601, location engine 113 receives one or more propagation-time measurements (e.g., round-trip time, etc.), wherein each measurement is that of a signal in a transmission between a wireless terminal (e.g., terminal 101-1, etc.) and base station 302-1. Measurements can be received for signals between multiple wireless terminals and a given base station, for signals between a given wireless terminal and multiple base stations, and for signals across multiple paths between each wireless terminal and base station, in any combination thereof. The measurements can be representative of signals from a base station to a wireless terminal, or from a wireless terminal to a base station, or both. In some embodiments of the present invention, a propagation-time measurement can be received in response to location engine 113 transmitting a mobile-terminated location request (MTLR) message, or equivalent.

The propagation-time measurements actually received by location engine 113 are based on the propagation-time-related measurements provided by terminal 101-1 as described above and in FIG. 2. In some embodiments of the present invention, one or more of the propagation-time measurements received by location engine 113 are further based on a predetermined constant. For example and without limitation, a wireless service provider in control of system 100 might choose to adjust (i.e., by a "fudge factor") one or more of the measurements provided by wireless terminal 101-1, in order to compensate for known signal paths within the equipment itself, such as signal path 404 that is characterized by a first propagation delay component. In this example, the service provider might attempt to correct by subtracting out the delay effects introduced by signal path 404, in order to obtain a measurement that is more representative of one or more signal paths between an antenna element (e.g., node 303-1, node 303-2, element 401, etc.) and wireless terminal 101-1, instead of between radio 403 and the wireless terminal.

Location engine 113 also can receive evidence of the location of one or more wireless terminals, such as terminal 101-1. Evidence of a location is data to which a location estimation algorithm can be applied in order to generate an estimated location (e.g., a geographic location, etc.). For example and without limitation, evidence of the location can comprise a signal-strength measurement, a time-related measurement, or information that, by itself, is not a representation of the geographic location of a wireless terminal, estimated or otherwise, but that is probative of the geographic location. In some alternative embodiments of the present invention, the evidence of a location can comprise a relatively coarse location, whereas the estimated location generated from the evidence can be a relatively fine location. The evidence of the location can be different from and independent of the propagation-time measurements, while concurrently the location to which the evidence applies can be coincident with the location at which and/or time interval during which the propagation-time characteristic was measured and/or reported.

Location engine 113 also can receive evidence of the location of one or more of the base stations, such as base station 302-1. In some embodiments, location engine 113 receives a geographic location of one or more of the base stations, in which the location or locations have been confirmed to a known degree of accuracy.

At task 603, in some embodiments of the present invention, location engine 113 estimates the geographic location of wireless terminal 101-1 based on the received evidence of the location of terminal 101-1, thereby establishing a "ground truth" for the location of the terminal. Engine 113 can estimate the location of other wireless terminals as well, thereby also establishing ground truths for those terminals. There are various techniques that can be used to estimate the location of wireless terminal 101-1 based on the received evidence. See for example and without limitation, U.S. Pat. Nos. 6,944,465, 7,460,505, 7,383,051, 7,257,414, 7,753,278, 7,433,695, 7,848,762, and 8,630,665, each of which is incorporated by reference herein. Location engine 113, in some embodiments of the present invention, can receive an estimate of the geographic location of wireless terminal 101-1 in which the estimate has been calculated elsewhere (e.g., by wireless terminal 101-1 itself, etc.). In some embodiments of the present invention, the uncertainties of one or more grounds truths are included as a component of the analysis represented by method 500.

At task 605, in some embodiments of the present invention, location engine 113 estimates a spatial displacement (e.g., shortest distance, etc.) between wireless terminal 101-1 and base station 302-1 based on the estimated location of terminal 101-1. Engine 113 can estimate the spatial displacements between other combinations of wireless terminals and base stations as well. In some embodiments of the present invention, evidence of the location of base station 302-1, the location itself of base station 302-1, or the location of an antenna element (e.g., node 303-1, node 303-2, element 401, etc.) is also used in estimating the spatial displacement.

At task 607, location engine 113 generates one or more statistics of a data set, in which the data set comprises data points that are based on at least some of the propagation-time measurements received in accordance with task 601. Task 607 is described in detail below and in FIG. 7.

At task 609, location engine 113 estimates one or more characteristics of antenna system 310 hosted by base station 302-1, based on the statistic generated at task 607. Task 609 is described in detail below and in FIG. 9. In some embodiments, location engine 113 estimates the one or more characteristics based on the spatial displacement or displacements estimated at task 605.

At task 611, location engine 113 estimates the location of a wireless terminal based on one or more of the characteristics estimated at task 609. Task 611 is described in detail below and in FIG. 10.

At task 613, location engine 113 transmits the location estimate that was made available at task 611, to a location application at application server 112. In some embodiments of the present invention, engine 113 transmits the location estimate to a device different from server 112 or uses the location estimate for its own purposes. In some other embodiments of the present invention, engine 113 transmits the one or more characteristics of the antenna system made available at task 609, to a device (e.g., an application engine, etc.) or uses the characteristics for its own purposes.

Location engine 113 then repeats one or more of the afore-described tasks.

Task 607: Generate a Statistic—

Figure 7:
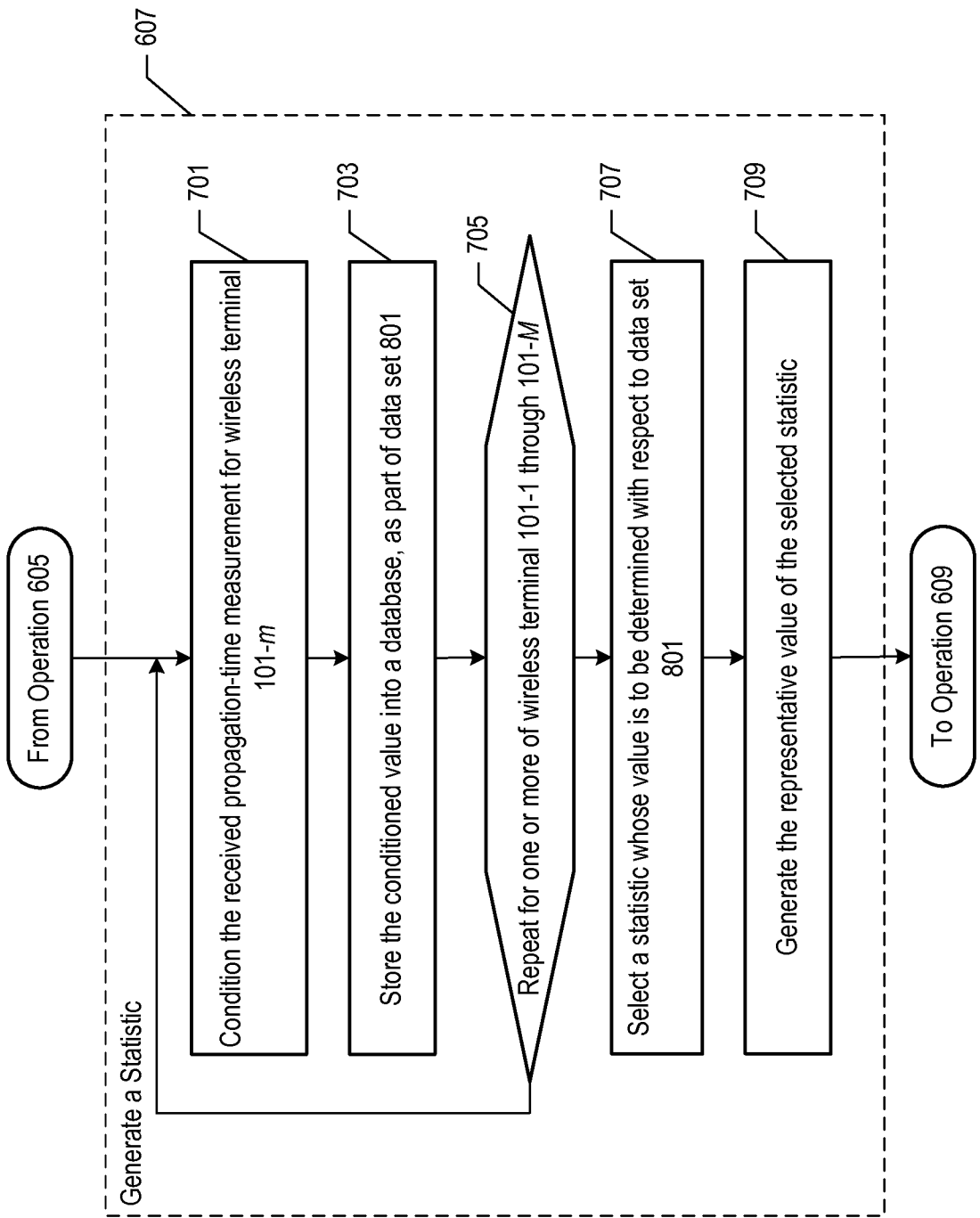
FIG. 7 depicts a flowchart of the salient processes performed in accordance with task 607.

FIG. 7 depicts a flowchart of the salient processes performed in accordance with task 607.

At task 701, location engine 113 optionally conditions the propagation-time measurement received at task 601, resulting in a conditioned value. In accordance with the illustrative embodiment of the present invention, conditioning the propagation-time measurement comprises converting the received measurement to a different measurement unit and/or to a different frame of reference. For example and without limitation, the propagation-time-related value can be converted to a time-related value that is more convenient to work with, such as by taking a round-trip-time (RTT) measurement, in chips, and converting it to a value in nanoseconds. As another example, an RTT measurement can be converted to a one-way measurement representation, instead of a round-trip representation.

In accordance with some embodiments of the present invention, the conditioning can comprise a calculation of the difference between the propagation-time measurement and a second value after they have been normalized or converted into comparable units of measure.

In regard to wireless propagation components 405 through 407 in FIG. 4, in some embodiments of the present invention the conditioned value might be adjusted in order to account for the probability of the propagation-time measurement not being representative of a direct-path radio signal, but of the measurement being influenced by an indirect-path or a multipath radio signal.

At task 703, location engine 113 stores the conditioned value, in memory 502's database, in order to build a data set, such as one of the data sets depicted in FIGS. 8A through 8E described below.

Figure 8A:
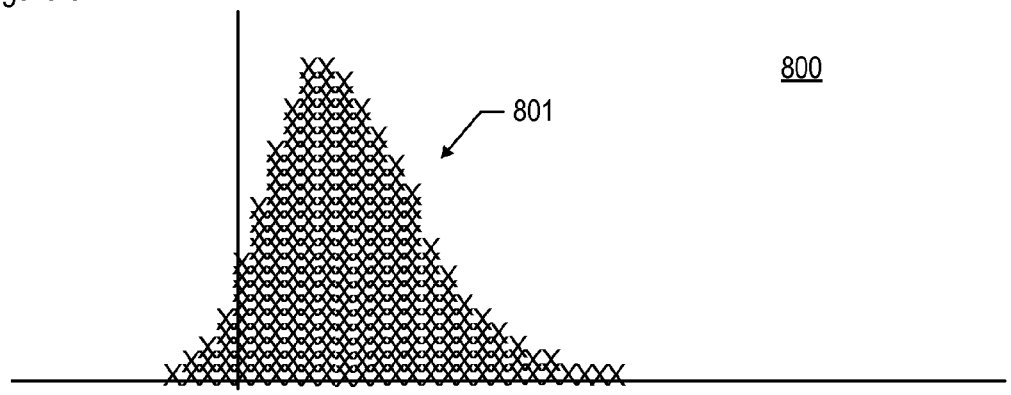
FIGS. 8A through 8E depict various probability distributions of various data sets.
Figure 8B:
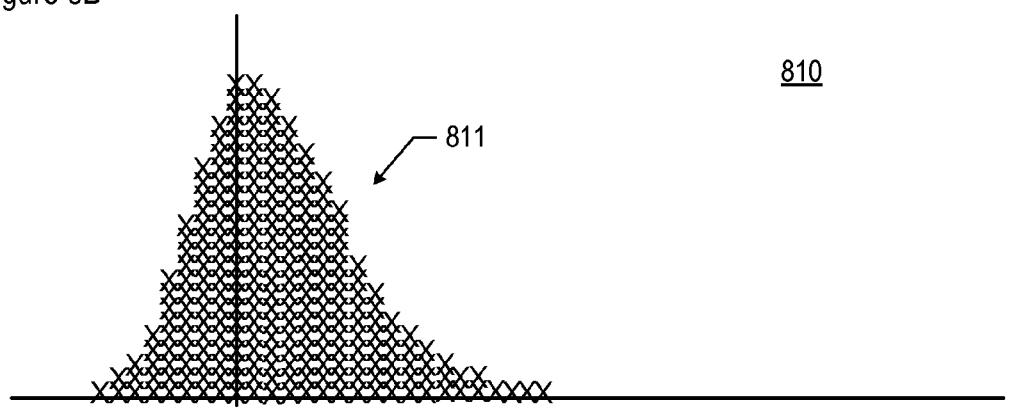
Figure 8C:
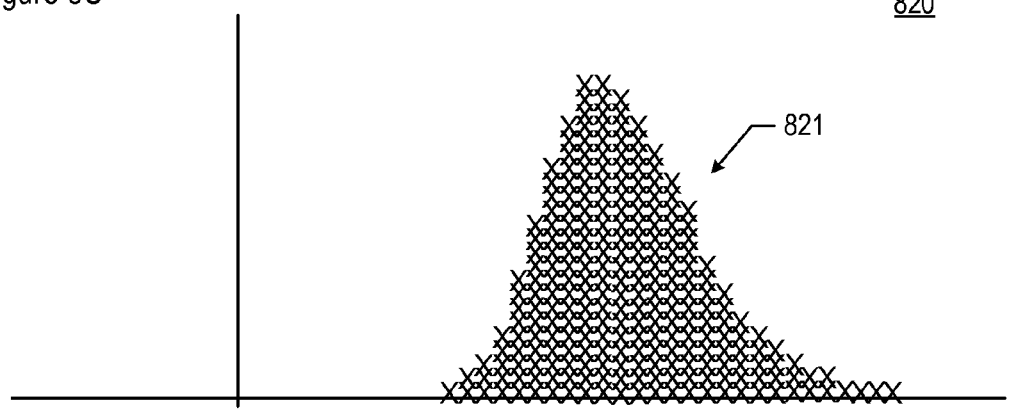
Figure 8D:
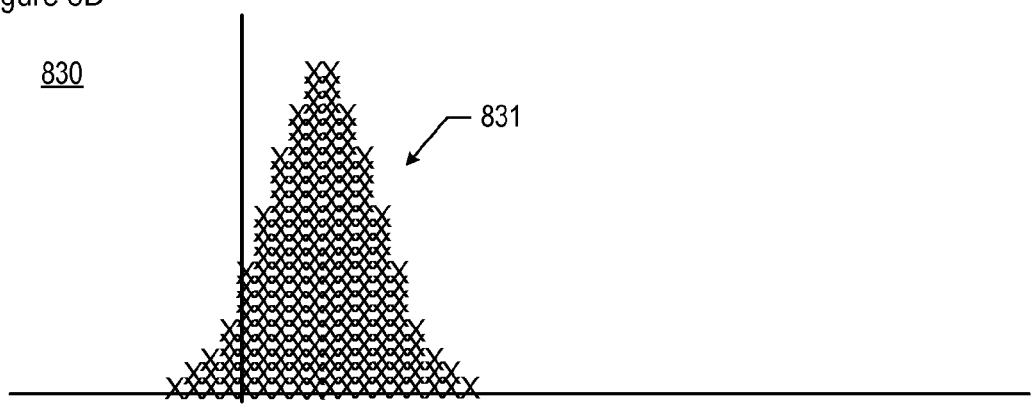

At task 705, location engine 113 repeats afore-described tasks 701 and 703 in order to ensure that number of values that constitute the data set is sufficient. FIG. 8A depicts a probability distribution 800 of data set 801, developed as a histogram of multiple conditioned values generated at task 701, which are being stored into memory at task 703. Data set 801 can comprise conditioned values that are representative only of a single wireless terminal/base station pair, representative of multiple wireless terminals with respect to a single base station, representative of one or more wireless terminals with respect to multiple base stations, and so on.

Some characteristics of data sets are discussed here. First, data set 801 extends over to the left side of the y-axis. One situation in which this can occur is when the service provider has overcorrected, in the propagation-time measurement data delivered to location engine 113, for electrical delays in the equipment (e.g., cabling, antenna amplifiers, etc.) that are present in path 404 of FIG. 4. The overcorrection might be even greater, as depicted by probability distribution 810 of data set 811 in FIG. 8B. On the other hand, the overcorrection might be small or non-existent, as depicted by probability distribution 820 of data set 821 in FIG. 8C. As those who are skilled in the art will appreciate after reading this specification, the relative position of the data set along the x-axis can be used to indicate or suggest that the cable delay compensation is too high, too low, or proper.

Second, the depicted data set exhibits some positive skewness (i.e., skewness to the right). One situation in which this can occur is when some multipath is present in the coverage area or areas from which the data originates. Alternatively, there might be little or no skewness, as depicted by probability distribution 830 of data set 831 in FIG. 8D. As those who are skilled in the art will appreciate after reading this specification, the skewness of the data set can be used to indicate or suggest a condition existing in the coverage area, such as multipath, as well as the degree to which the condition exists (e.g., high amount, low amount, non-existent, etc.).

The conditioned values that constitute the data sets can depend on various factors. For example and without limitation, data set 801 might be developed from conditioned values in which some or all of the base stations, in a predetermined group of base stations, are represented in those constituent conditioned values, if one of more of the following apply:
 a. similar radio-frequency (RF) propagation conditions (e.g., multipath, etc.) are present in the coverage areas of the base stations.
 b. similar base station equipment configurations (e.g., sectorization, etc.) exist.
 c. similar propagation-time corrections made by the service provider are in effect.

On the other hand, data set 801 might instead be developed from conditioned values in which only a single base station, or a limited group of similar base stations, is represented in those constituent conditioned values, if one or more of the following apply:
 a. different RF propagation conditions are present.
 b. different base station equipment configurations exist.
 c. different corrections made by the service provider are in effect.

Figure 8E:
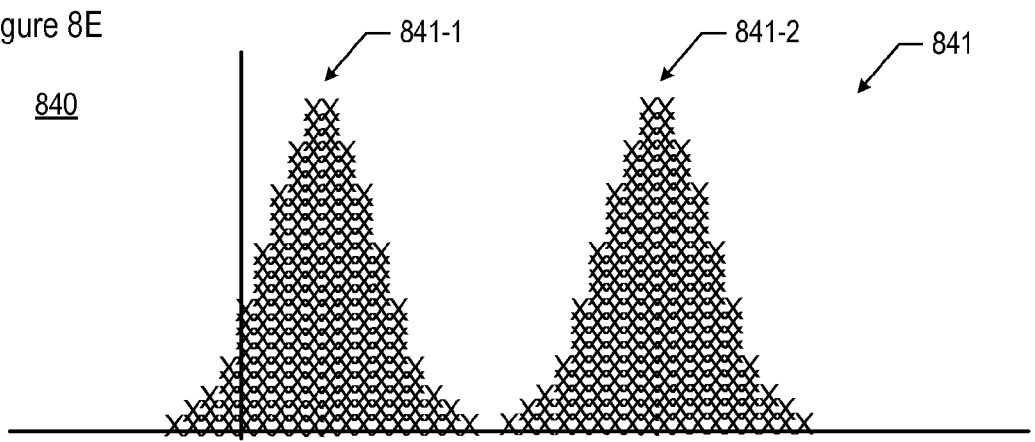

In regard to a distributed antenna system, FIG. 8E depicts a probability distribution 840 of data set 841, developed as a histogram of multiple conditioned values generated at task 701, which are being stored into memory at task 703. In this probability distribution, there are two distinct groupings of values, grouping 841-1 and 841-2. Each grouping corresponds to a different antenna node that constitutes the antenna system. For example, grouping 841-1 can correspond to antenna node 303-1 and grouping 841-2 can correspond to antenna node 303-2 in FIG. 3. The existence of the two groupings, as well as their characteristics, can be used to identify or suggest one or more characteristics of the antenna system, as described later.

At task 705, location engine 113 determines when a sufficient number of conditioned values have been accumulated as part of the data set. It will be clear to those who are skilled in the art after reading this specification, how to determine when a sufficient number has been accumulated. This might depend, for example, one or more sources of error such as the quantization error of the propagation-time (e.g., RTT, etc.) measurements made by the wireless terminals.

At task 707, location engine 113 selects one or more statistical algorithms whose resulting statistical values are to be determined with respect to one or more of the values in the data set being accumulated, which, for pedagogical purposes, is data set 841 that corresponds to a distributed antenna system. In some embodiments of the present invention, a to-be-determined statistic can be a descriptive statistic, in which case the statistic can be summary statistic or can be based on a summary statistic. Summary statistics include, while not being limited to:

a. the number of local groupings of data in data set 841 (e.g., grouping 841-1, etc.), each grouping corresponding to a local maximum in the data set
b. for one or more of the local groupings, a measure of location within data set 841—arithmetic mean, median, mode, interquartile mean, a predetermined percentile, etc.
c. for one or more of the local groupings, a measure of statistical dispersion within data set 841—standard deviation, variance, range, interquartile range, absolute deviation, distance standard deviation, etc.
d. for one or more of the local groupings, a measure of the shape of the distribution—skewness, distance skewness, etc.

As those who are skilled in the art will appreciate after reading this specification, the statistic can be selected based on one or more of: the RF environment (e.g., multipath that is present, etc.), the base station or stations involved (i.e., transmitting and/or receiving signals), the wireless terminal or terminals involved (i.e., transmitting and/or receiving signals), any correction or offset applied by the service provider, or trial-and-error, for example and without limitation.

At task 709, location engine 113 generates a first statistic by applying one or more corresponding, predetermined statistical algorithms to a data set, in well-known fashion. In some embodiments, engine 113 can adjust the generated statistic accordingly or calculate a value of an additional statistic or characteristic of data set 841 based on the first statistic. For example and without limitation, if the skewness of data set 841 indicates the presence of strong multipath (i.e., a distinct, positive skewness is observed), then the characteristic of data set 841 for which a value is calculated and eventually provided to task 609 might be a first characteristic. However, if the skewness of data set 841 indicates the presence of weak or no multipath (i.e., a slight skewness or no skewness is observed), then the characteristic of data set 841 for which a value is calculated and eventually provided to task 609 might be a second characteristic. As multipath might vary significantly from one cell of coverage to another, the mere presence of skewness might dictate that separate data sets be maintained and analyzed for each base station.

After task 709, control of task execution then proceeds to task 609.

As those who are skilled in the art will appreciate after reading this specification, a representation of a data set can be used that is alternative to the probability distribution representations depicted in FIGS. 8A through 8E. Moreover, a method of calculating a correction can be used that is alternative to generating a statistic of a data set.

Task 609: Estimate a Characteristic—

Figure 9:
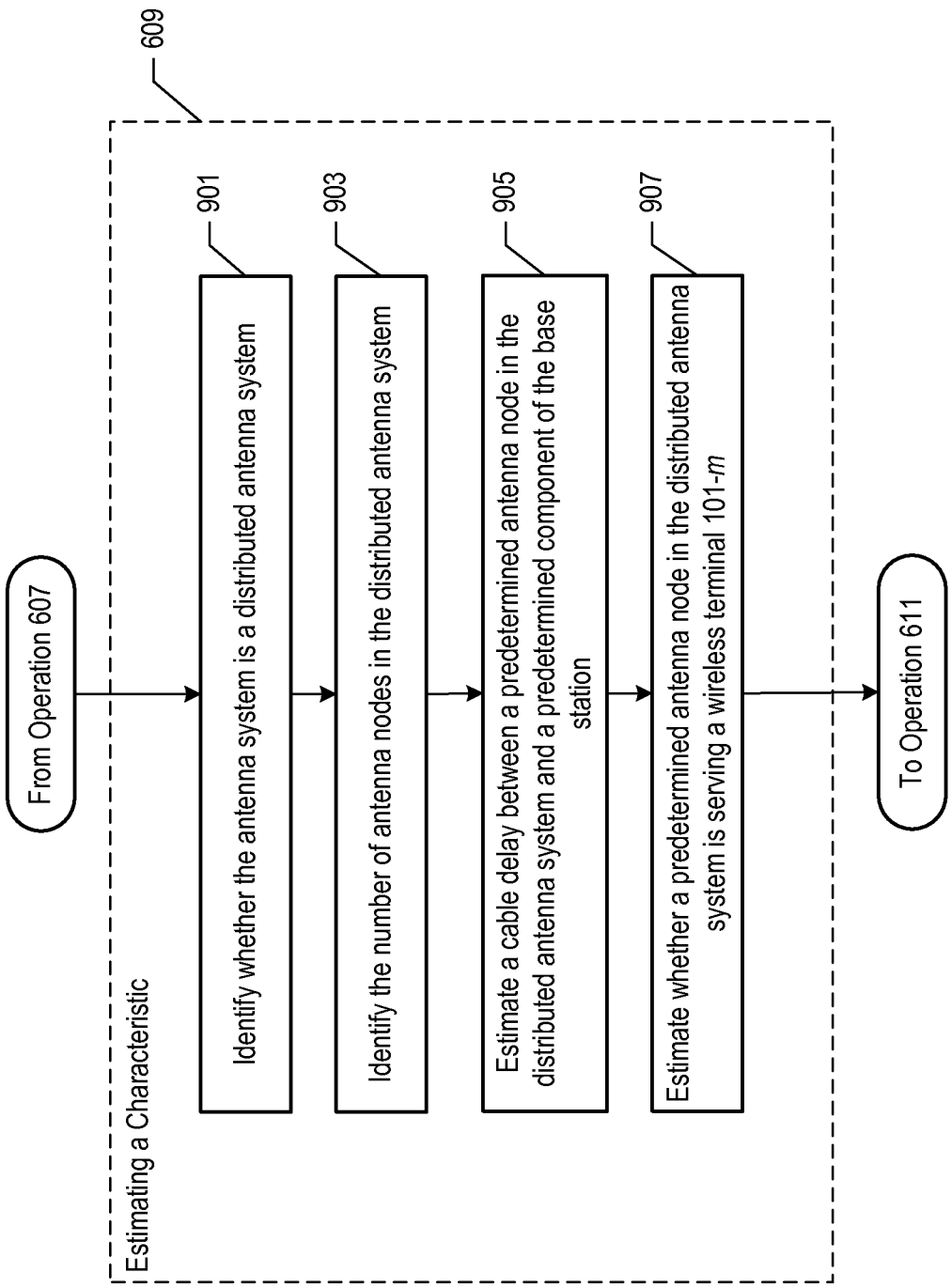
FIG. 9 depicts a flowchart of the salient processes performed in accordance with task 609.

FIG. 9 depicts a flowchart of the salient processes performed in accordance with task 609.

At task 901, location engine 113 identifies whether antenna system 310 corresponding to data set 841 is a distributed antenna system. Based on having determined, at task 709, the number of local maxima in data set 841 to be greater than one, engine 113 uses that statistic to infer that more than one antenna node exists in antenna system 310 and, accordingly, that the antenna system is a distributed antenna system. Engine 113 provides this result as a characteristic value.

At task 903, location engine 113 identifies the number of nodes in the distributed antenna system identified as such. Based on having determined, at task 709, the number of local maxima in data set 841, engine 113 uses that statistic to infer the number of antenna nodes. Engine 113 provides this result as a characteristic value.

At task 905, location engine 113 estimates a cable delay between a predetermined antenna node in the distributed antenna system identified as such and a predetermined component base station 302-1. Based on having determined, at task 709, the position of a local maximum (e.g., the leftmost in the data set, etc.) in data set 841 that corresponds to the predetermined antenna node of interest (e.g., node 303-1 closest to base station 302-1, etc.), engine 113 uses that statistic to estimate the cable delay. Engine 113 provides this result as a characteristic value.

At task 907, location engine 113 estimates whether a predetermined antenna node in the distributed antenna system identified as such is serving a first wireless terminal. Based on having determined, at task 709, the position of a local maximum (e.g., the leftmost in the data set, etc.) in data set 841 that corresponds to the predetermined antenna node of interest (e.g., node 303-1 closest to base station 302-1, etc.), engine 113 uses that statistic against which to compare one or more propagation-time measurements received for the first wireless terminal (i.e., measured by the first terminal and/or base station serving the first terminal). Based on the comparison, location engine 113 infers whether the antenna node is serving the first terminal. For example and without limitation, the inference can be based on the propagation-time measurement's closeness, relative position to, etc. the local maximum of the antenna node's data grouping in data set 841. Engine 113 provides this result as a characteristic value.

After task 907, control of task execution then proceeds to task 611.

Task 611: Estimate the Location—

Figure 10:
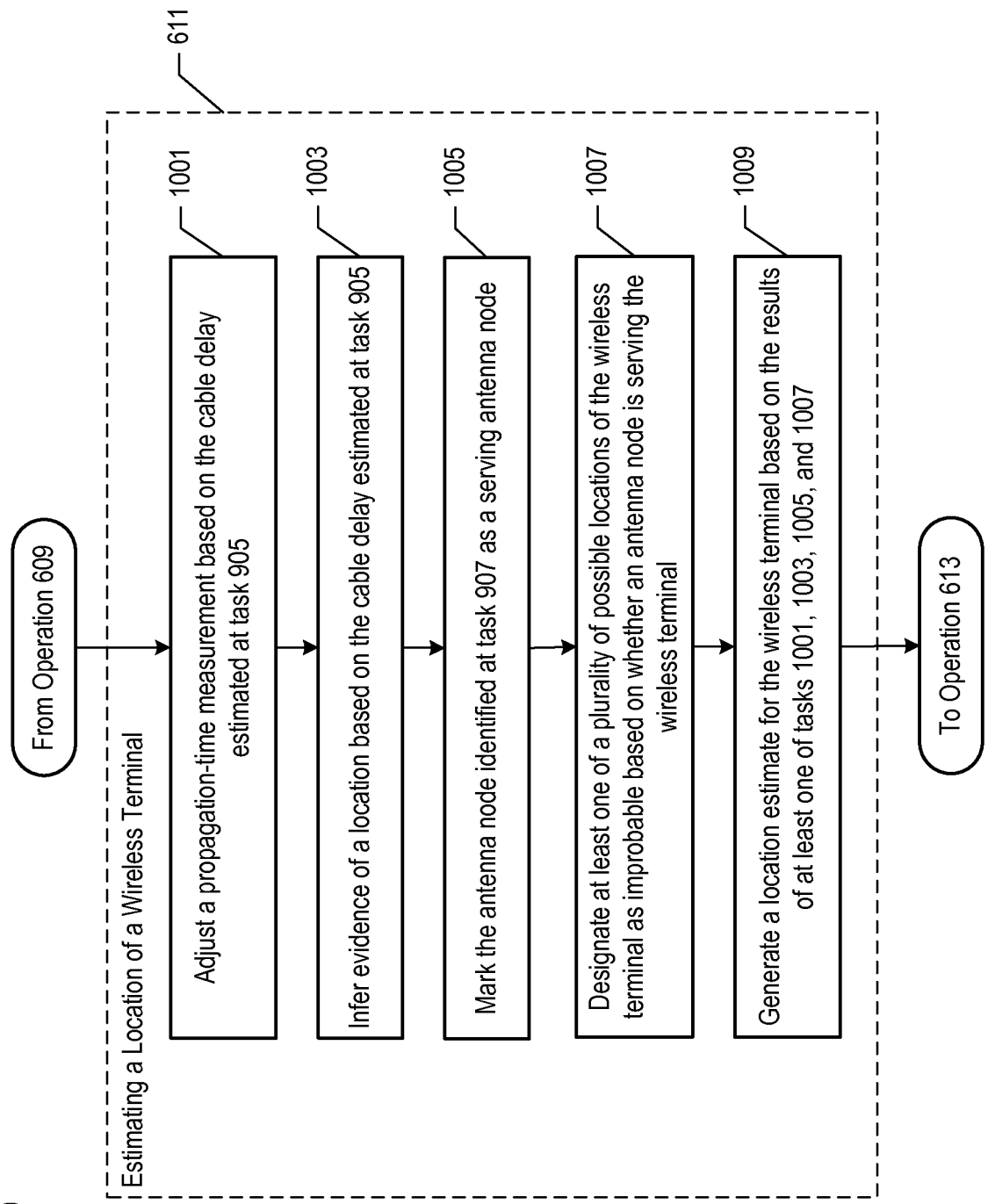
FIG. 10 depicts a flowchart of the salient processes performed in accordance with task 611.

FIG. 10 depicts a flowchart of the salient processes performed in accordance with task 611. In general, location engine 113 can determine the location of the wireless terminal in the following manner. Once the characteristic is made available at task 609, engine 113 can use that characteristic, or a second characteristic based on the first characteristic, to further adjust each propagation-time measurement being reported so that the propagation-time measurement can be directly used in a meaningful way to determine location. The adjusted and improved propagation-time measurement can then be directly used as part of one or more well-known techniques for location determination (e.g., OTDOA, Cell ID+RTT, etc.), in order to provide a location estimate that represents an improvement over a location estimate obtained by using the unadjusted measurements.

At task 1001, location engine 113 adjusts one or more propagation-time measurements based on the cable delay estimated at task 905. For example and without limitation, engine 113 can subtract the cable delay from the measurement, in order to provide an adjusted propagation-time measurement that is more representative of a propagation-time characteristic between the wireless terminal and the antenna node itself.

At task 1003, location engine 113 infers evidence of a location of wireless terminal 101-1 based on the cable delay estimated at task 905. For example and without limitation, if the distance implied by a received propagation-time measurement is small relative to the cable delay between a base station (e.g., station 302-1, etc.) and a remote, distributed antenna element (e.g., node 303-1, etc.), then the radiating source of the signal must be the base station's collocated antenna, thereby making one or more possible locations associated with the distributed antenna improbable. As another example, if the distance implied by a received propagation-time measurement exceeds the maximum distance associated with a particular antenna, then the radiating source of the signal must not be that antenna. This is because the distance implied by the received propagation-time measurement exceeds the maximum distance at which a signal radiated from an antenna collocated with the base station might be expected to be detectable, thereby making one or more possible locations associated with the base station's antenna improbable.

At task 1005, location engine 113 marks the antenna node identified as a serving antenna node of wireless terminal 101-1. This, in and of itself, provides evidence of location that can be used to generate a location estimate.

At task 1007, location engine 113 designates at least one of a plurality of possible locations of the wireless terminal 101-1 as improbable based on whether an antenna node is estimated to be serving first wireless terminal, such as the serving antenna node marked as such at task 1005. In some embodiments, location engine 113 can designate at least one of a plurality of possible locations of the wireless terminal 101-1 as improbable based on the outcome of task 1003. This designation of one or more possible locations as improbably is part of a process referred to as "search area reduction," which is now explained.

Depending on the location technique being used, without search area reduction all of the locations in geographic region 320 would have to be considered as candidates because, prior to process 1007, wireless terminal 101-1 could be in any location out of possibly thousands, millions, or billions of locations. Therefore, to expedite the performance of certain tasks, location engine 113 can perform one or more computationally efficient tests that quickly and summarily eliminate many possible locations for wireless terminal 101-1 from consideration, and, therefore, summarily set to zero the probability that wireless terminal 101-1 is at those locations. This reduces the number of locations that would otherwise have to be fully considered and generally improves the speed with which certain tasks are performed.

In accordance with the illustrative embodiment, one such test comprises the actions performed in accordance with task 1007. For example and without limitation, the probability that wireless terminal 101-1 is at the locations associated with an antenna node can be set to zero if the antenna node is not considered to be a serving antenna node. For more details in regard to search area reduction, see for example and without limitation, U.S. Pat. Nos. 6,944,465, 7,460,505, 7,383,051, 7,257,414, 7,753,278, 7,433,695, 7,848,762, and 8,630,665, each of which is incorporated by reference herein.

At task 1009, location engine 113 generates a location estimate of the geographic location of wireless terminal 101-1, based on the results from one or more of tasks 1001, 1003, 1005, and 1007. There are various techniques that can be used to estimate the location of wireless terminal 101-1 based on the results from the afore-listed tasks. See, for example and without limitation, one or more of the aforementioned U.S. patents. In some embodiments of the present invention, location estimation techniques other those described in the aforementioned U.S. patents can instead be used, as those who are skilled in the art will appreciate after reading this specification.

Location engine 113, in some embodiments of the present invention, can receive an initial estimate of the geographic location of wireless terminal 101-1 in which the initial estimate has been calculated elsewhere (e.g., by wireless terminal 101-1 itself, etc.) and can then apply the results from the afore-listed tasks in order to generate an updated estimate. In some embodiments of the present invention, the uncertainties of one or more grounds truths estimated at task 603 can be considered in generating the location estimate.

In accordance with the illustrative embodiment of the present invention, engine 113 estimates the location of a wireless terminal different from the one or more wireless terminals for which propagation-time measurements have been received at task 601. In some embodiments of the present invention, engine 113 refines the estimate of the location of one or more wireless terminals for which the propagation-time measurements have been received. In some other embodiments, location engine 113 estimates the location based on the spatial displacement or displacements estimated at task 605 and/or the statistic or statistics generated at task 607 and/or the characteristic or characteristics generated at task 609. As a result of this task, engine 113 makes available a location estimate of the wireless terminal.

In some embodiments of the present invention, the location estimate is based on concurrent or simultaneous propagation-time measurements between a wireless terminal and more than one base station. For example, analysis of the correlated measurements can add to the precision of the estimate.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a server computer, a plurality of propagation-time measurements of first signals transmitted between i) one or more wireless terminals and ii) a base station, wherein the first signals propagate through at least a portion of an antenna system that is communicatively coupled to the base station;
   generating a statistic, by the server computer, by applying a predetermined statistical algorithm to a data set, wherein the data set comprises data points that are based on the plurality of propagation-time measurements;
   estimating, by the server computer, a first characteristic of the antenna system based on the statistic; and transmitting the first characteristic, by the server computer, to an application engine.

2. The method of claim 1 wherein each of the plurality of propagation-time measurements is based on at least one of i) a round-trip time (RTT) measurement and ii) a timing advance (TA) measurement.

3. The method of claim 1 wherein the first characteristic identifies whether the antenna system is a distributed antenna system comprising at least two antenna nodes.

4. The method of claim 1 wherein the antenna system is a distributed antenna system, and further comprising identifying, by the server computer, the number of antenna nodes in the distributed antenna system based on the statistic having identified the number of local maxima in the data set.

5. The method of claim 1 further comprising:
receiving a propagation-time measurement of a second signal transmitted between a first wireless terminal and the base station; and
estimating the location of the first wireless terminal based on i) a cable delay between a first antenna node in the distributed antenna system and a predetermined component of the base station and ii) the propagation-time measurement of the second signal.

6. The method of claim 1 wherein the antenna system is a distributed antenna system, and further comprising estimating, based on the first characteristic, whether a first antenna node in the distributed antenna system is serving a first wireless terminal.

7. The method of claim 6 further comprising estimating the location of the first wireless terminal based on whether the first antenna node is estimated to be serving the first wireless terminal.

8. The method of claim 7 wherein the estimating of the location of the first wireless terminal is further based on designating at least one of a plurality of possible locations of the first wireless terminal as improbable based on whether the first antenna node is estimated to be serving first wireless terminal.

9. A method comprising:
receiving, by a server computer, i) a first plurality of propagation-time measurements of first signals transmitted between a first wireless terminal and a base station and ii) a second plurality of propagation-time measurements of second signals transmitted between a second wireless terminal and the base station, wherein the first and second signals propagate through at least a portion of an antenna system that is communicatively coupled to the base station;
generating a statistic, by the server computer, by applying a predetermined statistical algorithm to a data set, wherein the data set comprises data points that are based on the first plurality of propagation-time measurements and the second plurality of propagation-time measurements;
estimating, by the server computer, a first characteristic of the antenna system based on the statistic;
estimating, by the server computer, the location of a third wireless terminal based on the first characteristic of the antenna system, wherein the estimating of the location results in a location estimate; and
transmitting, by the server computer, the location estimate to a location-based application.

10. The method of claim 9 wherein each of the first plurality of propagation-time measurements is based on at least one of i) a round-trip time (RTT) measurement and ii) a timing advance (TA) measurement.

11. The method of claim 9 wherein the first characteristic identifies whether the antenna system is a distributed antenna system comprising at least two antenna nodes, and wherein the estimating of the location is further based on the value of the first characteristic.

12. The method of claim 9 further comprising:
receiving, by the server computer, a propagation-time measurement of a third signal transmitted between the third wireless terminal and the base station, wherein the estimating of the location is further based on the propagation-time measurement of the third signal.

13. The method of claim 9 wherein the antenna system is a distributed antenna system, and further comprising estimating, based on the first characteristic, whether a first antenna node in the distributed antenna system is serving the third wireless terminal, wherein the estimating of the location is further based on whether the first antenna node is serving the third wireless terminal.

14. The method of claim 13 wherein the estimating of the location is further based on designating at least one of a plurality of possible locations of the third wireless terminal as improbable based on the estimating of whether the first antenna node is serving the third wireless terminal.

15. A method comprising:
receiving, by a server computer, a plurality of propagation-time measurements of first signals transmitted between i) one or more wireless terminals and ii) a base station, wherein the first signals propagate through at least a portion of a distributed antenna system (DAS) that is communicatively coupled to the base station, the distributed antenna system comprising at least two antenna nodes;
generating a statistic, by the server computer, by applying a predetermined statistical algorithm to a data set, wherein the data set comprises data points that are based on the plurality of propagation-time measurements;
estimating, by the server computer, a first characteristic of a first antenna node of the at least two antenna nodes, based on the statistic;
estimating, by the server computer, the location of a first wireless terminal based on the first characteristic of the antenna system, wherein the estimating of the location results in a location estimate; and
transmitting, by the server computer, the location estimate to a location-based application.

16. The method of claim 15 wherein each of the plurality of propagation-time measurements is based on at least one of i) a round-trip time (RTT) measurement and ii) a timing advance (TA) measurement.

17. The method of claim 15 wherein the first characteristic relates to cable delay between the first antenna node in the distributed antenna system and a predetermined component of the base station, and wherein the estimating of the location is further based on the cable delay.

18. The method of claim 15 further comprising receiving, by the server computer, a propagation-time measurement of a second signal transmitted between the first wireless terminal and the base station, wherein the estimating of the location is further based on the propagation-time measurement of the second signal.

19. The method of claim 15 further comprising estimating, based on the first characteristic, whether the first antenna node in the distributed antenna system is serving the first wireless terminal, wherein the estimating of the location is further based on whether the first antenna node is serving the first wireless terminal.

20. The method of claim 19 wherein the estimating of the location is further based on designating at least one of a plurality of possible locations of the first wireless terminal as improbable based on the estimating of whether the first antenna node is serving the first wireless terminal.

\* \* \* \* \*